(12) United States Patent
Newman et al.

(10) Patent No.: US 7,093,485 B2
(45) Date of Patent: Aug. 22, 2006

(54) FUEL LEVEL SENSOR

(75) Inventors: Todd R. Newman, Traverse City, MI (US); John Washeleski, Cadillac, MI (US)

(73) Assignee: Nartron Corporation, Reed City, MI (US)

( * ) Notice: Subject to any disclaimer, the term of this patent is extended or adjusted under 35 U.S.C. 154(b) by 0 days.

(21) Appl. No.: 10/715,032

(22) Filed: Nov. 17, 2003

(65) Prior Publication Data
US 2005/0103103 A1  May 19, 2005

(51) Int. Cl.
*G01F 23/38* (2006.01)
(52) U.S. Cl. .................................... 73/317
(58) Field of Classification Search ............. None
See application file for complete search history.

(56) References Cited

U.S. PATENT DOCUMENTS

| | | | | |
|---|---|---|---|---|
| 2,325,582 | A * | 7/1943 | Andersen | 73/317 |
| 3,256,907 | A * | 6/1966 | Clark et al. | 73/317 |
| 4,507,961 | A * | 4/1985 | Stradella | 73/317 |
| 5,023,806 | A * | 6/1991 | Patel | 73/317 |
| 5,150,615 | A | 9/1992 | Rymut et al. | |
| 5,504,427 | A | 4/1996 | Cooper et al. | |
| 6,089,086 | A * | 7/2000 | Swindler et al. | 73/317 |
| 6,211,668 | B1 * | 4/2001 | Duesler et al. | 324/207.2 |
| 6,396,259 | B1 | 5/2002 | Washeleski et al. | |
| 6,508,121 | B1 * | 1/2003 | Eck | 73/317 |
| 6,595,239 | B1 * | 7/2003 | Korst et al. | 137/558 |
| 6,734,667 | B1 * | 5/2004 | Lorenzen | 73/1.75 |

* cited by examiner

*Primary Examiner*—Charles Garber
*Assistant Examiner*—Paul M. West
(74) *Attorney, Agent, or Firm*—Watts Hoffmann Co., LPA

(57) ABSTRACT

A fuel level sensor for sensing and monitoring the level of remaining fluid in a container such as a fuel tank for a motorized vehicle is disclosed. The fuel level sensor incorporates an improved float and pivot arm member attached to a hub that rotates about a pivot base. The conventional resistor card technology, commonly found in automotive applications for translating the position of the float into an electrical signal, is replaced by a more reliable non-contact magnetic flux sensing circuit. The fuel level sensor incorporates a magnetic sensor and magnetic circuit in a commonly known and practiced rotational position sensor configuration for determining the angular position of a hub relative to its pivot base, where the hub is attached to a conventional float-arm member and the base remains stationary relative to the fuel container. The preferred embodiment includes a magnetic flux sensor positioned between two movable magnets. The magnetic flux sensing element is a Hall effect integrated circuit, magnetoresistor, magnetodiode, magnetotransistor, or similar magnetic flux sensing element with associated electronic circuitry having adjustable or programmable features including ratiometry, gain, offset voltage, temperature coefficient, and output signal range limiting. Critical electronic components are hermetically sealed making the fuel level sensor fully submersible in fuel for long term fuel exposure.

24 Claims, 9 Drawing Sheets

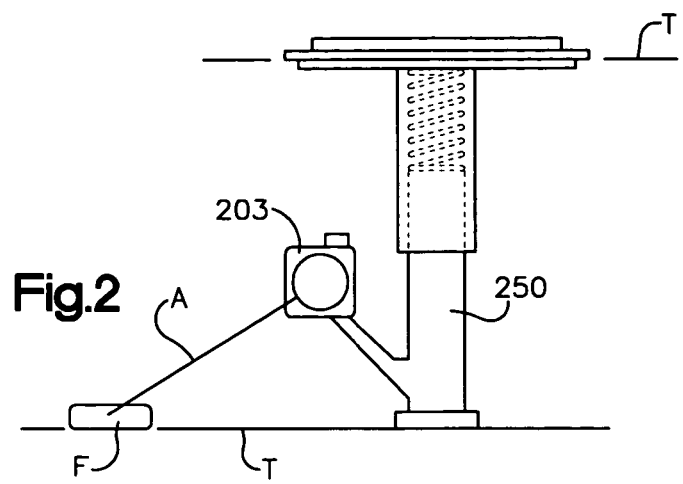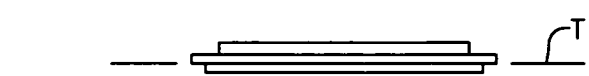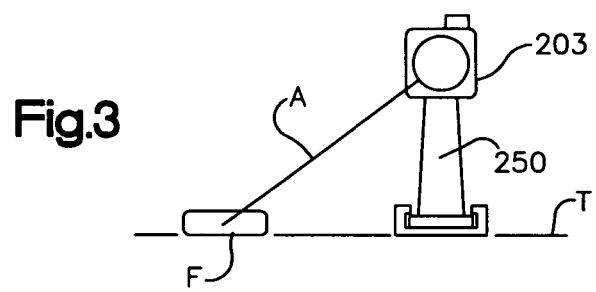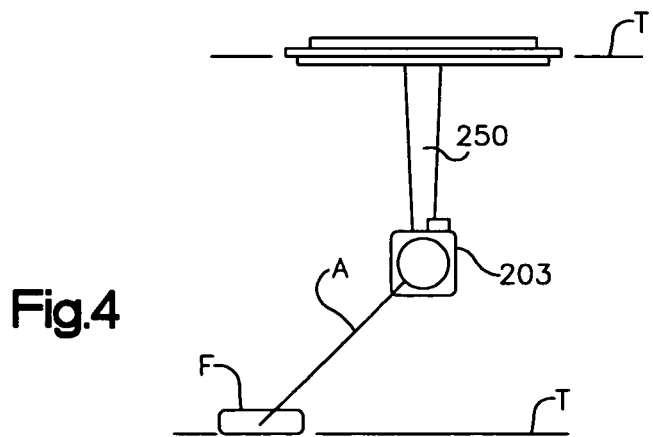

FUEL LEVEL SENSOR

CROSS REFERENCE TO RELATED APPLICATIONS

The present application relates to U.S. patent application Ser. No. 09/325,883, filed Jun. 4, 1999 now U.S. Pat. No. 6,396,259, entitled Electronic Throttle Control Position Sensor. The subject matter of this application is incorporated herein by reference.

BACKGROUND OF THE INVENTION

1. Field of the Invention

This invention relates to an electrical position sensing circuit and particularly a liquid level sensing circuit used to make possible a non-contact electronic fuel level sensor for measuring the amount of fuel remaining in a motor vehicle gas tank.

2. Background Art

Fuel level sensors known for monitoring the level of fuel within a gas tank are resistive, ultrasonic, electromagnetic, and shaped electromagnetic field in nature. Resistive type sensors rely on contact connections to a resistive element. A float and a pivot arm move such that when the fuel tank is full, the wiper contact is at one extreme of the resistive element, and when the tank is empty the wiper contact is at the other extreme. It is known that such contact type sensors wear over time, making non-contact type sensors desirable. Ultrasonic, electromagnetic, and shaped electromagnetic field sensors have complex electronics to drive the sensor element and determine the fuel level. Their complexity makes component costs high.

Fuel level sensors are particularly well known in the automotive industry where they are used extensively in passenger cars and trucks. For many years automotive manufactures have relied on the resistor card technology to provide a feasible and economical fuel level sensing approach for use in motor vehicles.

The resistor card can be characterized as an electrical potentiometer configured as a variable resistor. Its wiper is mechanically fixed to a float or combination float and float arm mechanism that rises and falls with the level of liquid in a fuel tank. The value of resistance developed across the potentiometer's resistor element as a result of wiper positioning, corresponds to the position of the float, hence the level of liquid in the fuel tank. This resistance value is then read by configuring the sensor resistor element in series with a second known resistance. When a known voltage is applied across the two series resistive elements a voltage divider circuit is created wherein the voltage produced at the common electrical node of the two resistive elements directly correlates to the position of the potentiometer's wiper and hence the position of the attached float.

Despite its moderate precision and performance, the resistor card has been the preferred fuel level sensor supplied to the automotive industry. Only recently have automotive manufacturers begun to search for more robust and precise technologies that can replace the resistor card as a fuel level sensor.

Manufacturers trying to reduce product warranty costs and offer products with longer life must look beyond resistor card technology. Although regarded as low cost, the resistor card is not a cost effective solution for fuel level sensing when its characteristics of product reliability and service life are considered. The major fault of the resistor card is its reliance on a mechanical wiper to maintain electrical contact to the resistive element within its assembly. Level sensors that incorporate a mechanical contact have a number of well-known problems. The mechanical movements within any mechanism make those components susceptible to wear, fatigue, and loosening. This is a progressive problem that occurs with use and leads to eventual failure after a sufficient amount of movement has occurred.

In fuel level sensing, a source of mechanical failure for the resistor card comes from fluid sloshing inside the fuel tank thus creating unwanted twisting and levering of the float and float arm. This force is transferred from the float to the wiper of the resistor card where it stresses the components by applying alternate weak and strong contact force between the wiper and the resistive element. Under these conditions the wiper may eventually fatigue losing its spring characteristics and may even loosen from its rotational pivot hub. Eventually the wiper will lose electrical contact with the resistor element.

Exposure to continuous vibration, like that experienced on a moving vehicle, produces excessive movement of the wiper with respect to the resistor element. While stationary about one position, dithering of the wiper against the resistor element leads to excessive wear and pitting of the resistor element at that particular wiper position. This action eventually damages the resistor element by altering the resistance of the sensor at that position.

Over time contaminants build up on the wiper and resistive element. This contamination can produce poor electrical contact between the wiper and the resistive element leading to sensor inaccuracies or malfunction. Increasing the force of the wiper against the resistive element will help to keep the contact point between the wiper and resistive element clean thus reducing possible failures. However, the additional force applied between the wiper and resistive element increases the frictional force against each other. This accelerates wear on the components thereby reducing the sensor's service life.

Another problem experienced with the resistor card is its inability to survive long-term exposure to newer types of fuels now used in automobiles. Exposure to Methanol, Ethanol, peroxide and other fuel additives are known to breakdown the inking adhesives used in making the resistor element of the card. Eventually contact of the wiper and the resistive element opens causing operational failure of the level sensor.

One solution to overcoming the inherent problems of mechanical type sensors like the resistor card is found in non-contact type sensors. In recent years magnetic flux sensor technology, particularly that of the Hall effect sensor, has developed into a robust and reliable technology.

The integration of custom circuitry with the Hall effect sensing element makes it possible to produce Hall effect sensors that have advanced features like analog, PWM, and digital output capability. Compensation circuitry now available in Hall effect sensors allow for much greater accuracy and linearity over operating temperatures. Hall effect sensors now offer programmable features that permit adjustable control of output signal ratiometry, sensitivity, voltage offset, temperature coefficient, and output signal range limiting. Even advanced features of functional diagnostics can be integrated into the Hall effect circuitry.

An analog Hall effect sensor is designed to output a voltage that is proportional to the strength of a magnetic field of which it is exposed to. In truth the Hall effect sensor responds to the strength and polarity of the magnetic field that passes perpendicular to its internal magnetic flux sensing element. That is to say that the Hall effect sensor will produce the greatest change in output voltage when the magnetic lines of flux that make up the magnetic field are perpendicular to the magnetic flux sensing element, and have no response when the lines of magnetic flux are parallel to the magnetic flux sensing element. The physical relationship between the magnetic field and the Hall effect sensor can be altered by moving the magnetic field with respect to a stationary Hall effect sensor.

To produce a change in the output of the Hall effect sensor, the relative air gap between the magnet and Hall effect sensor can be changed. As the magnet moves further from the Hall effect sensor, the sensor is exposed to lesser magnetic field thereby inducing less effect on the sensor. Likewise as the magnet is moved closer to the Hall effect sensor, the sensor is exposed to greater magnetic field that produces more change of the sensors output voltage. This functional principle is demonstrated by use of a rotating involuted magnet in Nartron U.S. Pat. No. 6,396,259, Electronic Throttle Control Position Sensor.

Another useful approach to varying the magnetic field strength, of which the Hall effect sensor is exposed to, is to use a tapered magnet. A magnet's field strength increases in proportion to its thickness. Increasing the thickness of a magnet placed before the Hall effect sensor will increase the output response from the sensor. This principle is taught in CTS U.S. Pat. No. 6,211,668, Magnetic Position Sensing Having Opposed Tapered Magnets.

Yet another approach places a pole piece behind the Hall effect sensor. In this configuration the Hall effect sensor is positioned between the magnet and pole piece. As the pole piece moves towards the Hall effect sensor, the air gap between the pole piece and Hall effect sensor is reduced. Likewise the distance gap between the pole piece and the magnet is reduced, thereby attracting the magnetic field towards the pole piece and passing more magnetic lines of flux through the magnetic flux sensing element and into the pole piece. This functional principle is demonstrated in Nartron U.S. Pat. No. 6,396,259, Electronic Throttle Control Position Sensor, using an involuted pole piece that is rotated about its center axis to produce a closing air gap with rotation.

Since the magnetic flux sensing element is sensitive only to lines of magnetic flux passing perpendicular to its element plate, and therefore does not respond to magnetic flux that is in parallel with its element plate, a third preferred method of producing a response in the Hall effect sensor exists. Rotating the magnet about the Hall effect sensor changes the angle in which the lines of magnetic flux pass through the magnetic flux sensing element. The resultant magnetic field acting perpendicular to the magnetic flux sensing element generates a response from the sensor proportional to this perpendicular field strength. This approach is described in Nartron U.S. Pat. No. 6,396,259, Electronic Throttle Control Position Sensor.

Two additional prior art patents owned by the assignee of the invention relating to similar technology are U.S. Pat. No. 5,504,427 to Cooper et al and U.S. Pat. No. 5,150,615 to Rymut et al. These patents are incorporated herein by reference.

SUMMARY OF THE INVENTION

The present invention concerns an easy to install, reliable, and accurate fluid level sensor. One embodiment of the invention concerns a fuel level sensor. However, the design can be easily adapted to other fluid level sensing applications like engine oil, radiator fluid, brake fluid, and power steering fluid. Still other applications can include rotational position sensing such as accelerator pedal, throttle position, suspension position, or valve position. The output signal from a sensor constructed in accordance with the invention provides continuous resolution and can be used to accurately measure rotational position, or linear position when mechanically translated into rotational movement.

In accordance with one embodiment, two bipolar bar magnets are placed 180 degrees apart with their magnetic poles oriented similarly along a single axis so that the magnetic field from each magnet interacts to produce a straight line of magnetic flux that extends between the two magnets. A Hall effect sensor is centered in the magnetic field created between the two magnets with its internal magnetic flux sensing element aligned along the common magnet axis. When the magnets are rotated about the Hall effect sensor, the resultant lines of magnetic flux passing perpendicular to the magnetic flux sensing element produce a linear and proportional voltage output response in relation to the rotational angle of travel.

A level sensor constructed in accordance with the invention includes a housing for containing a magnetic flux sensor, integral connector means, and attachment means; a rotating hub for mounting magnets, pivot arm and float. The magnetic flux sensor is insulated from contact with fluid in the container by its housing. A float positioned within the container travels up and down with changing levels of fluid. As the float moves, its position is translated to rotational angle by means of a rigid pivot arm connected from the float to a rotating hub. As the hub rotates, magnets within the hub change orientation with the magnetic flux sensor that remains stationary inside a pivot shaft of the housing. This allows the magnetic flux sensor to sense the changes in orientation of the magnetic field and produce a signal indicative of the fluid level within the container.

In one embodiment, the magnetic flux sensor is mounted in an enclosed housing supported within the fuel tank. The housing also supports a lead frame that forms the terminals for a connector and allows for the magnetic flux sensor to be electrically connected to circuitry external to the housing.

Other objects, advantages and features of the invention will become better understood from a detailed description of the preferred embodiment of the invention that is described in conjunction with the accompanying drawings.

BRIEF DESCRIPTION OF THE DRAWINGS

The accompanying drawings are not to scale and are intended to depict only the typical embodiment of the invention and should therefore not be considered as limiting the scope of the invention.

FIG. 2 illustrates the fuel level sensor in a flange mounted, bottom reference, position;

FIG. 3 illustrates the fuel level sensor in a bottom tank mounted, bottom reference, position;

FIG. 4 illustrates the fuel level sensor in a flange mounted, top reference, position;

BEST MODE FOR CARRYING OUT THE INVENTION

Several exemplary embodiments of the invention are disclosed. These alternate embodiments translate a position of a float into the rotational movement of a magnet support and associated magnet. A presently preferred embodiment uses a traditional rigid float arm that attaches the float to a magnet hub. The longer a float arm is, the less angular rotation of the magnet hub will occur for the same linear travel of the float. Likewise, a shorter float arm will yield more angular rotation for the same linear travel of the float. In fluid level sensing, the float arm travel is limited to less than 180 degrees of motion. This is well suited for a Hall effect sensor.

If the relationship formed between the float's travel, float arm length, and magnet hub angular rotation is not favorable to the application, a gear assembly could be implemented to either reduce or increase the angular rotation of the magnet hub for given travel of the float.

Other methods of coupling the float to the magnet hub are by use of a float positioned around a twisted shaft (FIG. 13) where the float is permitted to rise and fall around the shaft while itself restricted from rotation. As the float moves up or down, the shaft must rotate in an amount that is proportional to the movement of the float. Connecting a magnet hub that supports a magnet to an end of the shaft then produces an angular rotation of the hub for a given amount of float travel.

Figure 1:
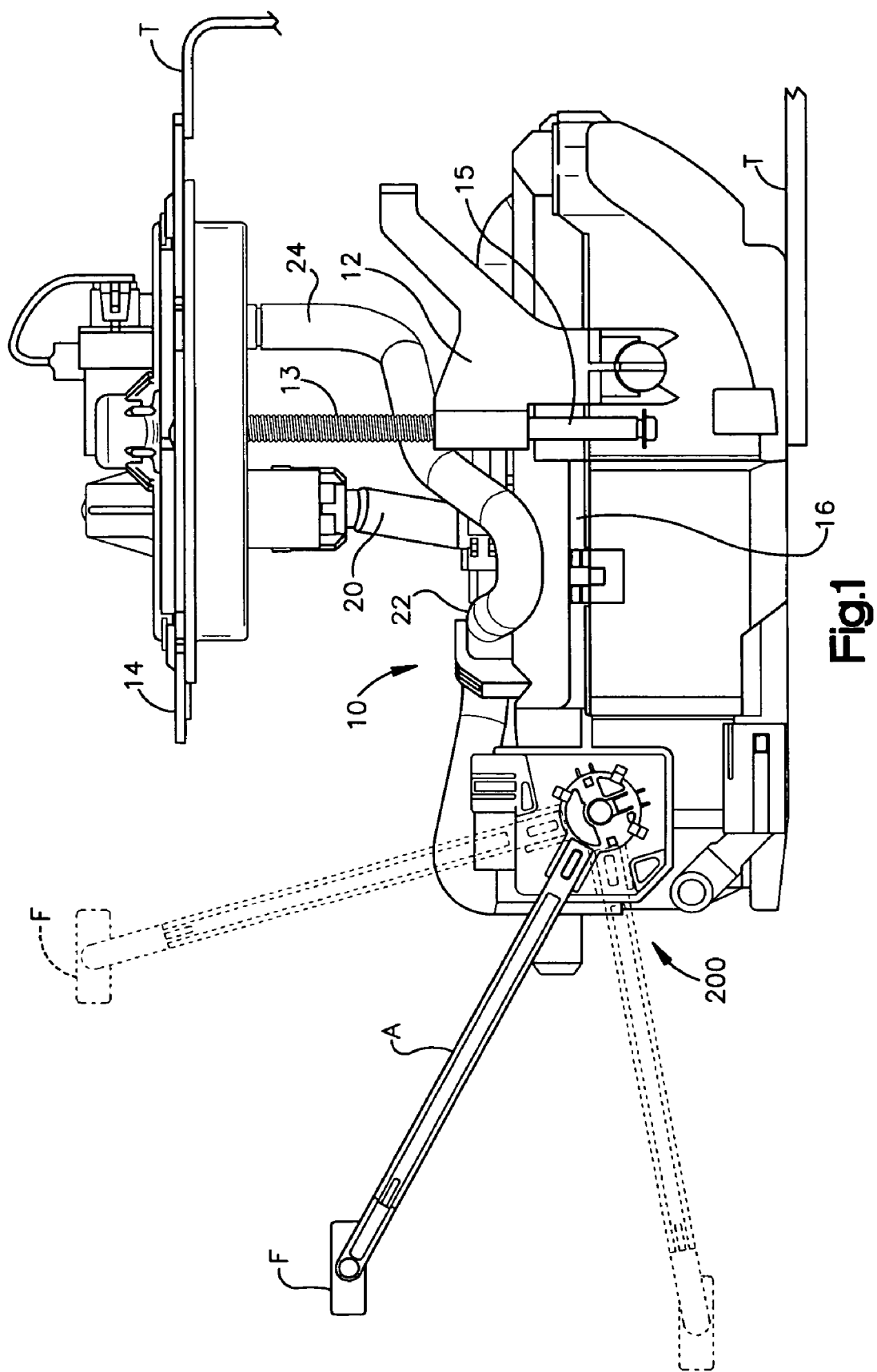
FIG. 1 illustrates the fuel level sensor attached to the fuel pump assembly with bottom reference sensing.

FIG. 1 illustrates a region of a motor vehicle gas tank T including a fuel pump assembly 10 within the tank T. The fuel pump assembly 10 is coupled to a brace 12, which in combination with a compression spring 13 biases the assembly 10 downward against a bottom surface of the fuel tank T. A flange 14 connected to the tank T is connected to a downwardly extending shaft 15 that extends through the brace. The fuel pump (not shown) is positioned within a fuel pump reservoir 16. Electrical signals for energizing and controlling operation of the fuel pump are routed through electrical conduit 20 that passes through the flange 14. A discharge port 22 of the fuel pump delivers fuel under pressure through a conduit 24 to a motor vehicle engine for combustion.

Attached to one side of the fuel pump reservoir 16 is a fluid level sensor assembly 200. The assembly 200 provides a means for monitoring movement of a float F whose position with respect to the bottom wall of the fuel tank T changes with the level of fuel in the tank T. In the illustrated embodiment of the invention, the fuel level float F exerts a force on a pivoting arm A that is mounted for rotation at one end and attached to the float F at an opposite end.

Figure 5:
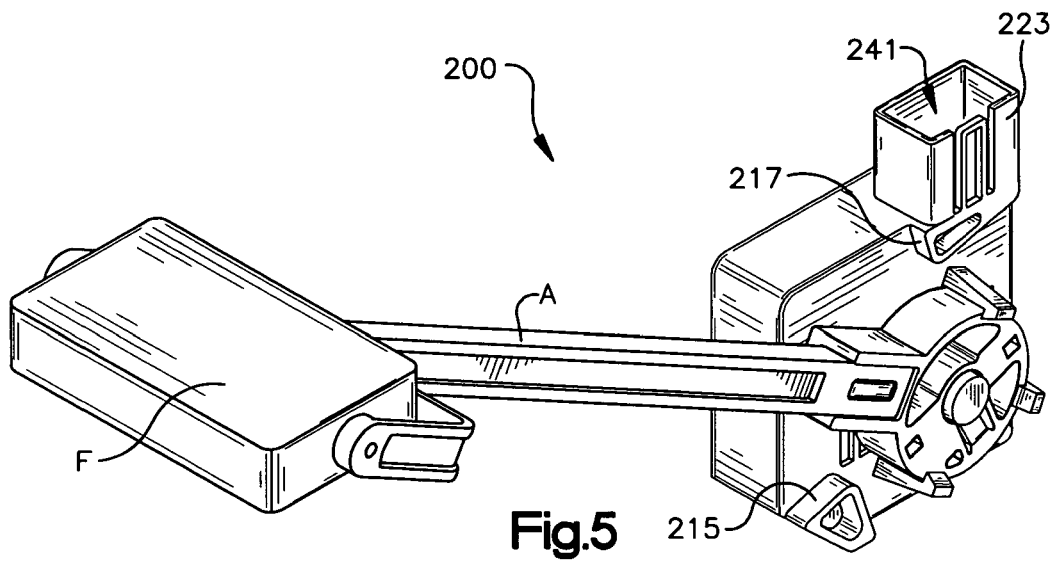
FIG. 5 illustrates a 3-dimensional view of a completed fluid level sensor assembly depicted in its preferred embodiment.
Figure 6:
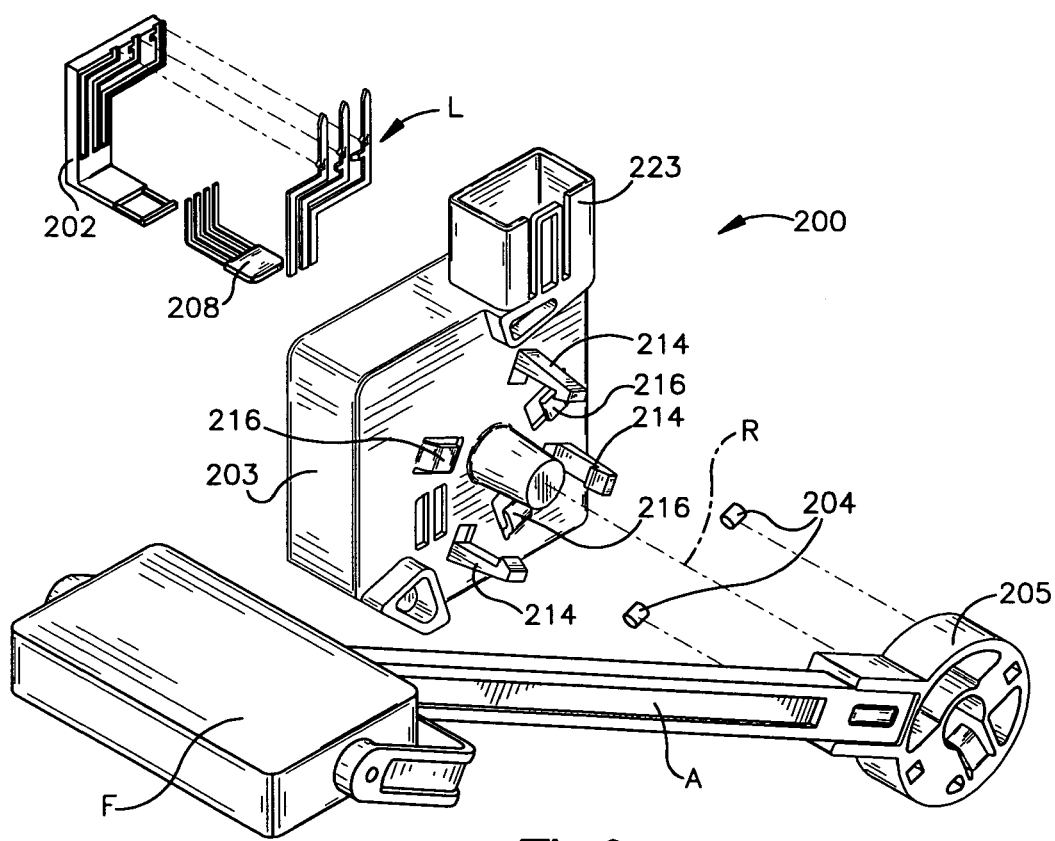
FIG. 6 is an exploded view of the fluid level sensor assembly showing the main components of the design.

FIG. 5 shows one view of the Fluid Level Sensor assembly 200 and how it might appear as an assembly prior to being installed into a container for measuring fluid level such as that of an automotive fuel tank. FIG. 6 is an exploded view of the Fluid Level Sensor assembly so that the main features of the invention can be addressed. A Fluid Level Sensor 200 includes a pivot base assembly comprised of a pivot base 203, lead frame L, which defines a number (three in the exemplary embodiment) of metal leads. The lead frame includes metal interconnections between individual leads that are removed during fabrication of the sensor assembly 200 to establish electrical isolation between leads. Hall effect sensor 208 is supported in contact with the leads that make up the lead frame by an encapsulant 202 and includes Hall sensor contacts that engage the leads. In the exemplary embodiment the Hall sensor 208 has four contacts and the center two are coupled together. The fluid level sensor 200 also includes a float arm assembly comprised of a magnet hub 205, magnets 204, float arm A, and float F.

The pivot base 203 utilizes 3 integrated springs 216 and 3 integrated latch features 214 to positively axially locate the magnet hub 205 along an axis of rotation R relative to the pivot base 203. This feature helps maintain the axial physical relationship between the system magnets 204 and the Hall effect sensor 208. With the physical relationship maintained the sensor system's output repeatability is increased. The pivot base 203 has an integrated mounting feature projection 219 so that the sensor system can be mounted to and positively located on a fuel pump assembly 10 (FIG. 1) or other fuel system mounting feature (not shown in drawings). The pivot base 203 has two integrated float arm travel stops 215 and 217. The first travel stop 215 limits the downward motion of the float arm assembly. This position signifies a lower limit of the sensor output voltage. The second travel stop 217 limits the upward motion on the float arm assembly. This position signifies upper limit of the sensor output voltage.

The pivot base 203, in particular an integral terminal block 223 of the pivot base 203, and the lead frame L create an integrated electrical connector to supply electrical power to the Hall effect sensor 208 as well as to provide the electrical connection for the Hall effect sensor 208 return signal output. In conjunction with the pivot base 203, the lead frame L mechanically locates the Hall effect sensor 208 within the pivot base assembly.

The Hall effect sensor 208 is a programmable Hall effect component. A semiconductor that varies its voltage output relative to the strength of the magnetic flux field it experiences. This device can be programmed to a.) Compensate for temperature shifts of the system, b.) Compensate for the variation in magnetic strength of the system magnets 204, c.) Compensate for the manufacturing tolerances of the final assembly by adjusting the output voltage gain, and d) Compensate for the manufacturing tolerances of the final assembly by adjusting an offset voltage.

The encapsulant 202 of the Fuel Level Sensor 200 creates an impervious seal against harsh fluids like automotive fuels. A material of this type may also be described as a sealant, adhesive, potting compound, or gasket forming material. The encapsulant 202 keeps fluid away from the systems electronic components including the Hall effect sensor 208 and accompanying components like capacitors or resistors. In addition the encapsulant 202 acts as a dampener to reduce the mechanical shock and vibration effects that are typically experienced in an application such as automotive. The encapsulant dampens mechanical vibrations imposed on the Hall effect sensor 208, the lead frame L, and other optional electrical components. This dampening action significantly reduces the possibility of fracturing the electrical components and electrical connections and helps maintain mechanical location of the Hall effect sensor 208 relative to the pivot base 203.

Figure 8A:
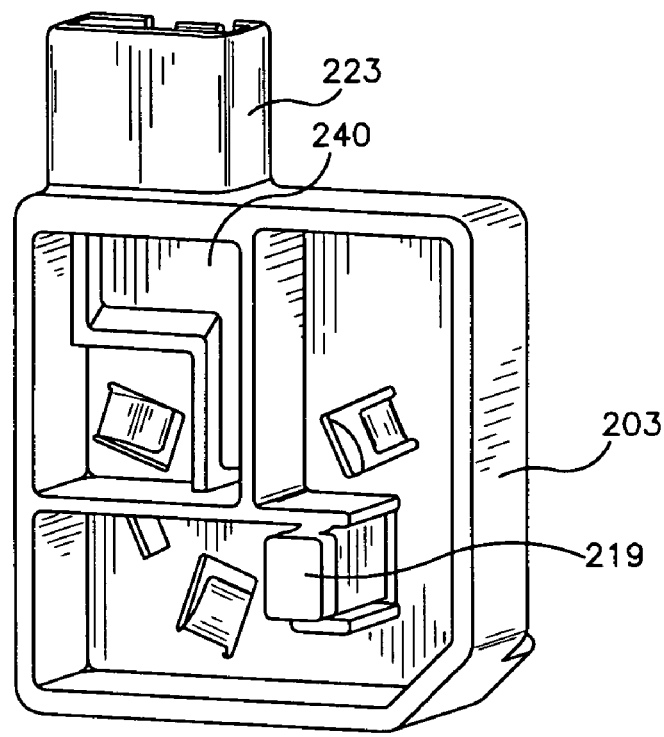
FIG. 8a is a 3-dimensional back view of the fluid level sensor pivot base.
Figure 8B:
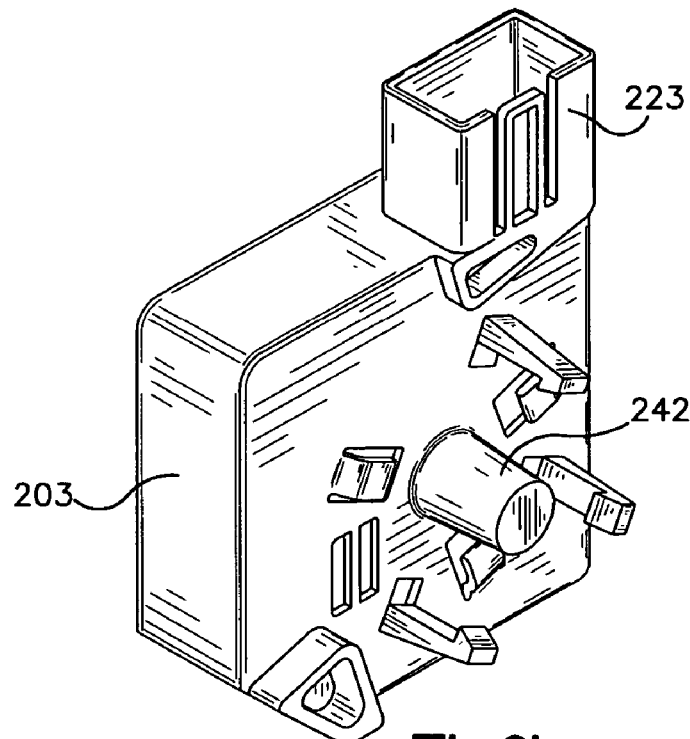
FIG. 8b is a 3-dimensional front view of the fluid level sensor pivot base.
Figure 9:
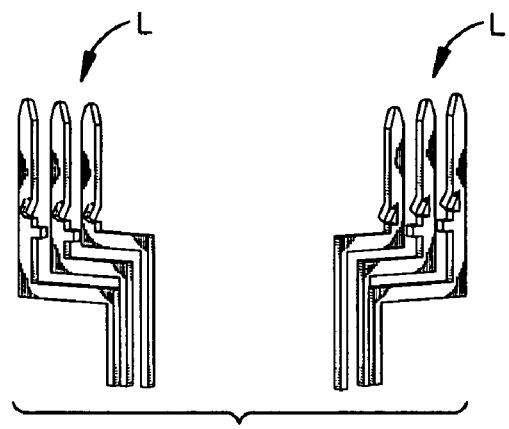
FIG. 9 is a 3-dimensional front and back view of the fluid level sensor lead frame.
Figure 10:
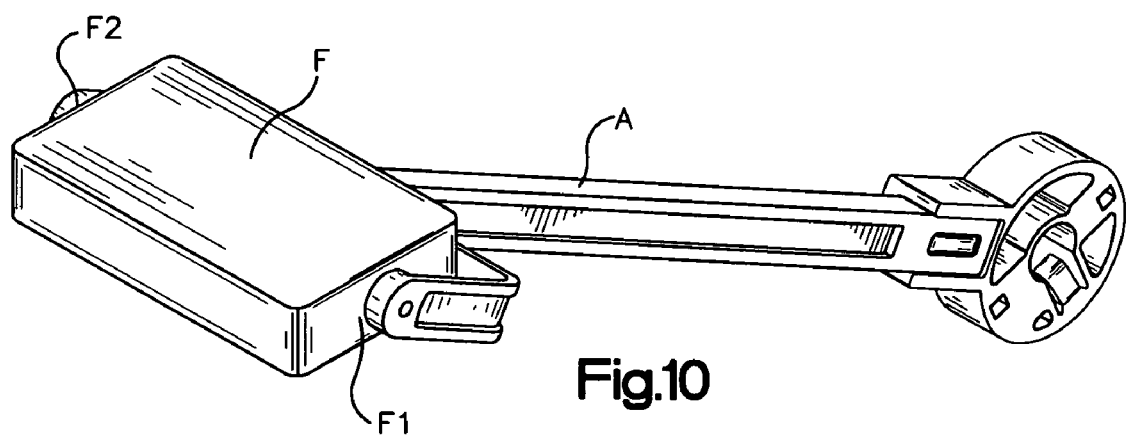
FIG. 10 is a 3-dimensional view of the fluid level sensor float arm assembly.

During fabrication of the sensor assembly 200, the leads that make up the lead frame L are attached by welding, soldering or the like to appropriate contacts of the Hall sensor 208. The combination of the lead frame and hall device is inserted into the base 203 from a rear of the base (FIG. 8a). A cavity 240 in the base 203 is exposed from the rear and opens upwardly into a region 241 bounded by the four generally rectangular walls of the terminal block 223. The leads of the lead frame L are positioned to extend upwardly into this region 241 for contact with an electrical connector which routes signals through the flange 14 in FIG. 1. The hall sensor is slid into a slotted center region of a cylindrical shaft 242. The interconnections between leads in the lead frame L are then severed and the encapsulant poured or dispensed into the cavity 240 to encapsulate the leads, the hall sensor contacts and the hall sensor. A suitable encapsulant for use in an exemplary system sold by Flamemaster under part number CS3204 A2 and is a polysulfide. The material is used to line joints of aircraft fuel tanks and is also referred to as a sealing compound that is similar to silicone in its characteristics.

When the encapsulant alone is insufficient to protect the Hall effect sensor and accompanying components from exposure to the fuel and fuel vapor, an alternate means of encapsulation of the Hall effect sensor is used. This alternate protection for the Hall effect sensor is disclosed in FIGS. 14 and 15. Prolonged exposure or operation under extreme conditions of the fuel level sensor in harsh fluids may require that special encapsulation materials and assembly processes be applied. With this alternate embodiment, the Hall effect sensor 208 is placed within a protective housing 300 that is impervious to fuels. The housing is formed from a piece of extruded tubing or deep drawn cap made of stainless steel. Stainless steel possesses the property of being impervious to fuels or fuel vapor and is a non-ferromagnetic metal. As a non-ferromagnetic material, the stainless steel housing permits the Hall effect sensor to respond to changes in magnetic flux, produced by magnets position external to the housing, without interference.

The alternate and presently preferred embodiment for encapsulating a Hall effect sensor for use in fuel is a stainless steel capsule. The use of specialized encapsulants in sealing electronics from fuel described above is at this time considered an alternate approach rather than the preferred. A capsule configuration offers the greatest resistance against permeation of fuels into the sensor cavity where it could chemically break down the composition of the electronic components thereby destroying sensor functionality.

Figure 14:
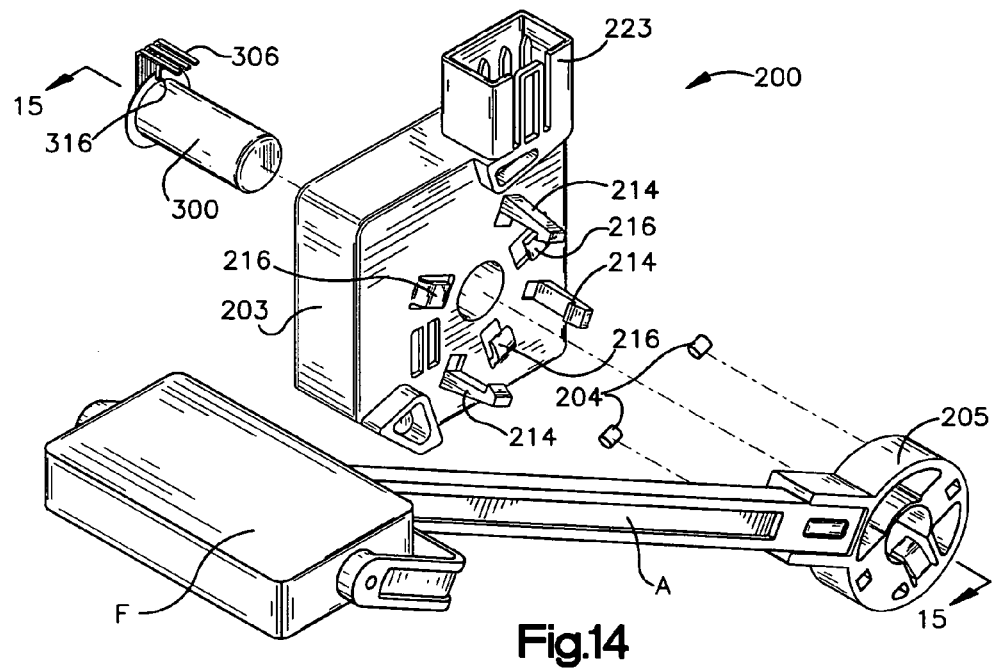
FIG. 14 illustrates an additional embodiment of the invention wherein the sensor electronics is shielded from a harsh operating environment by a stainless steel housing.
Figure 15:
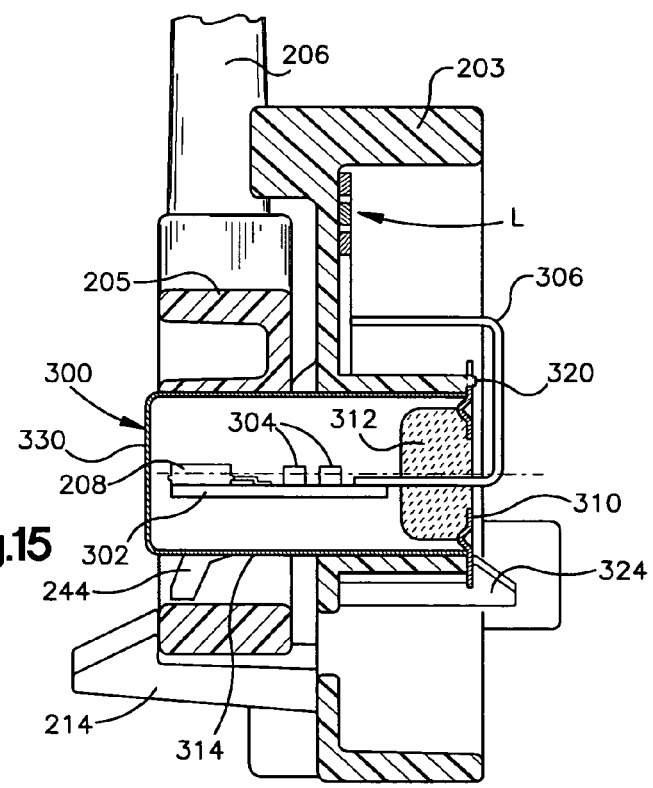
FIG. 15 is a view as seen from the plane 15—15 in FIG. 14.

As seen in FIGS. 14 and 15, the Hall effect sensor 208 is mounted onto a printed circuit board 302 along with two EMI filter components 304. The circuit board helps to ensure correct placement of the electronic components and provides a secure platform for the components during shock and vibration exposure. The circuit board also simplifies the manufacturing process by permitting assembly using standard surface mount component placement equipment.

Once populated, the printed circuit board is soldered to three conductive leads 306 on one side of a capsule base 310. Traces on the circuit board couple contacts of the Hall effect device 208 to contacts at one end of the board. The leads 306 of the capsule base are formed from stainless steel then plated with a solderable finish for bonding to the circuit board. The conductive leads pass straight through the capsule base and are sufficiently strong to support and stabilize the printed circuit board during periods of high mechanical stress. Electrical isolation of the leads from one another and from the capsule base is achieved using a glass insulator 312. A glass passivation process is used to seat the conductive leads into the capsule base.

The capsule base is made from stainless shell. It is electrically isolated from the sensor's internal circuitry. If necessary the base could be tied to a voltage potential, like ground, without affecting operation. The glass passivation process creates an impervious seal between the stainless steel of the base 310 and glass 312. This seal is important in resisting the permeation of fuels into the capsule.

After the printed circuit board is attached to the capsule base, a barrel cap 314 is placed over the circuit board and resistance welded to the base. Like the capsule base, the barrel cap is also made from stainless steel. When welded into place, it completes a hermetic seal around the sensor's electronic circuitry thereby protecting the circuitry from harmful fuels.

Notches 316 in the capsule base allow the finished capsule assembly to be correctly oriented as the notches 316 are snapped onto the feature 320 on the pivot base 203. These features 320 on the pivot base help secure the capsule in place and properly orient the sensor for operation. Additionally, the pivot base 203 has a capsule retaining arm 324 that flexes to allow the capsule housing 300 to be inserted. Once the capsule housing is inserted, the retaining arm 324 firmly retains the capsule housing 300 into the pivot base 203. The barrel 314 of the capsule protrudes outward from the pivot base creating the shaft on which the magnet hub 205 rotates. In the capsule configuration of FIGS. 14 and 15 the pivot base 203 does not require a shaft for the magnet hub 205. Instead the barrel 314 of the capsule is used as a bearing for the hub 205. This not only simplifies the assembly process but also permits tighter tolerances in the design. The stainless steel barrel will maintain truer geometry while producing less frictional force between its own surface and the inside wall of the magnet hub. Although not shown in FIG. 15, an encapsulant such as the above noted encapsulant could be used in the region of the printed circuit board 302 to dampen vibration and reduce risk of shock damage to the components inside the housing 300.

Stainless steel is a non-ferromagnetic material and therefore does not significantly distort the magnetic field used in operation of the Fuel Level Sensor. Using special passivation processes, glass will bond to stainless steel with superior adhesion properties. Both stainless and glass are excellent barrier materials against permeation of fuel molecules. Together the two materials create a hermetic capsule around the electronic circuitry to keep out fuel. While other materials that exhibit similar non-ferromagnetic properties and low fuel permeation could be used to house the electronic circuitry, none are known at the present time.

The conductive leads 306 extending from the capsule assembly are attached to conductors of a lead frame L that form the male terminals of the pivot base connector. In another configuration, the conductive leads of the capsule can be formed to become the male terminals of the pivot base connector with an additional lead frame.

At one end of the housing conductive leads isolated by glass pass through the stainless steel using a glass passivation process. Like stainless steel, the glass exhibits superior resistance to the permeation of fuels or fuel vapor. The glass also acts as a dielectric to insulate the conductive leads from the stainless steel housing. Eventually these leads are used to make electrical connection to the Hall effect sensor inside of the housing.

The conductive leads provide not only electrical connection to the Hall effect sensor, but also become a lead frame that produces a rigid platform for the Hall effect sensor and other sensor circuitry to rest upon. Glass passivation of the conductive leads prior to insertion of the Hall effect sensor prevents the Hall effect sensor from exposure to the high temperatures associated with the glass passivation process. In the assembly process when the Hall effect sensor is placed, the lead frame instead provides a means of safely extracting heat away from the Hall effect sensor and other electronic components.

Once the Hall effect sensor has been assembled onto the lead frame inside of the stainless steel housing, an encapsulant can be added around the Hall effect sensor and accompanying circuitry. The encapsulant helps to provide additional support for the circuitry against vibration and shock. The encapsulant also assures absolute positioning of the Hall effect sensor thereby maintaining the sensor's repeatability and accuracy over time. As increased mass inside of the stainless steel housing, the encapsulant will help to extract heat away from the electronic circuitry during the final assembly process.

Final housing assembly consists of sealing the remaining open end of the stainless steel housing, opposite the glass passivated conductive leads, with a stainless steel cap 330. This cap is either spin welded or spot welded onto the housing. The weld completes an impenetrable seal against fuel or fuel vapor from intrusion into the housing, thus giving the fuel level sensor prolonged operation in harsh automotive fuels. The housing assembly is mounted into the pivot base thereby completing the pivot base assembly. No additional lead frame is required. The conductive leads extending from the stainless steel housing assembly complete the integrated electrical connector.

Figure 7A:
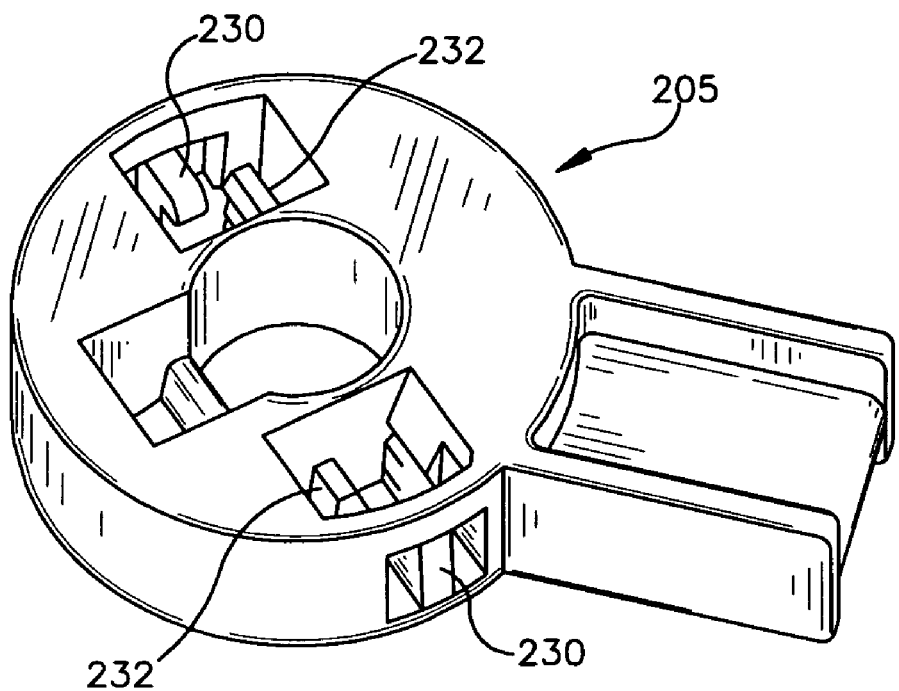
FIG. 7a is a 3-dimensional front view of the fluid level sensor hub.
Figure 7B:
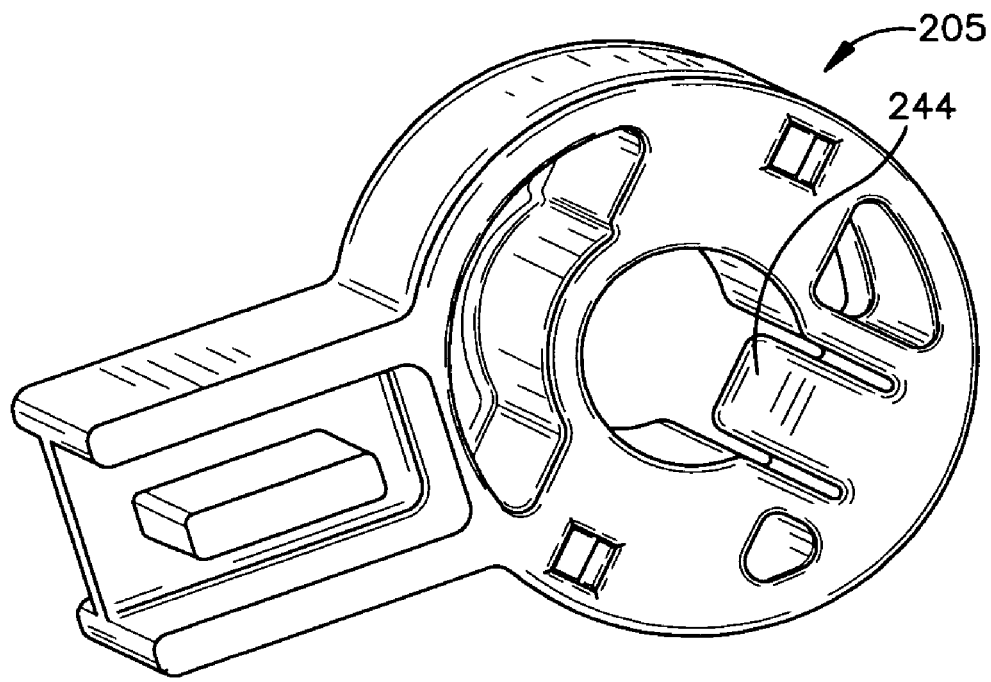
FIG. 7b is a 3-dimensional back view of the fluid level sensor hub.

The magnet hub 205 positively locates the system magnets 204 relative to itself by using 2 integrated spring members 230 and 232 (FIG. 7a). One of the spring members 230 applies an axial force to a magnet 204 locating the magnet 204 toward the pivot opening in the center of the magnet hub 205. The second spring member 232 applies a force to the magnet 204 that positively locates the magnet 204 both in its depth within the magnet hub 205 and relative to the axis of rotation of the magnet 204 being coincident with the pivot axis R of the magnet hub 205. The magnet hub 205 utilizes an integrated spring 244 that maintains a concentricity relationship with the pivot base 203. This feature helps maintain the physical relationship between the magnet hub 205 and the Hall effect sensor 208. With the physical relationship maintained the Fluid Level Sensor system's output repeatability is increased.

Figure 11:
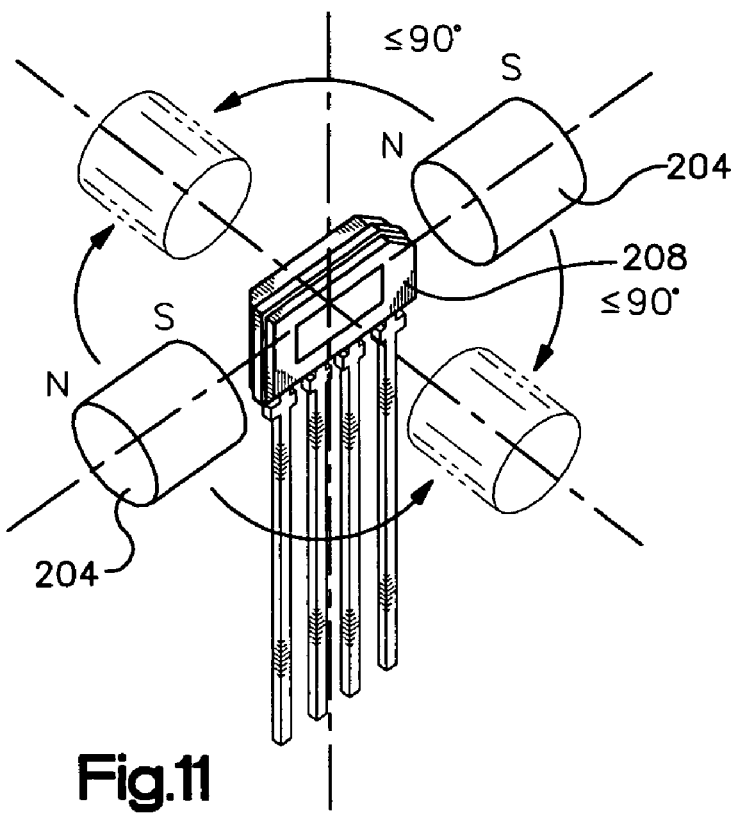
FIG. 11 is a 3-dimensional view illustrating magnet orientation and movement around Hall effect sensor.
Figure 12:
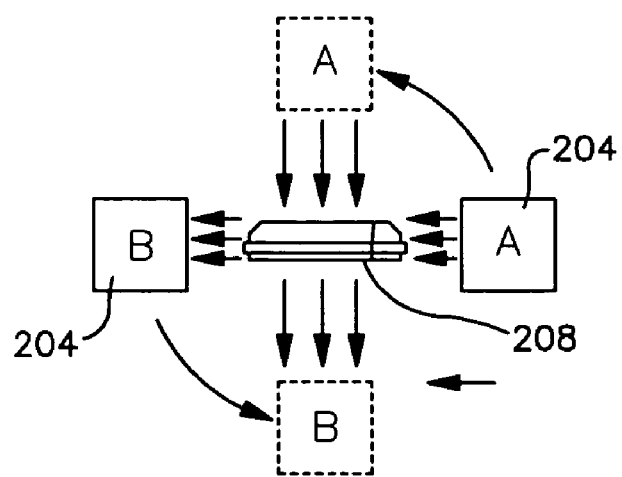
FIG. 12 illustrates magnet orientation and lines of magnetic flux around Hall effect sensor.

The system magnets 204 provide the Fluid Level Sensor system a magnetic field. As the magnet hub 205 rotates about the pivot base 203 the magnetic field strength that the Hall effect sensor 208 experiences changes. As the magnetic field strength experienced by the Hall effect sensor 208 varies, the voltage output of the Fluid Level Sensor changes. The relationship between magnets and hall sensor and the field set up by the magnets is shown in more detail in FIGS. 11 and 12.

The float arm A connects the float F to the magnet hub 205. The float F is buoyant in automotive fuels and as the fuel level rises and falls the float remains near the fuel surface. The float arm A rotates about the pivot base 203 as the float level changes. The float arm A, which is connected to the magnet hub 205, causes the system magnets 204 to rotate relative to the Hall effect sensor 208. This motion creates variations in the sensor output voltage signifying changes in fuel level. Multiple other float arm assembly geometries to accommodate various fuel tank shapes are depicted in FIGS. 2–4. In each embodiment the base 203 is fixed stationary with respect to a fuel tank T. In each embodiment a support 250 supports the base 203 and contacts or is attached to an inner surface of either the tank T or the flange 14.

The float F is buoyant in automotive fuels and as the fuel level rises and falls the float remains near the fuel surface. By maximizing the contact surface of the float F to the fluid, very low levels of fluid can be measured with precision. In the preferred embodiment a thickness of the float is less than either a length or a width dimension. This pancake shape feature is important in applications where the knowledge of true low fluid level is critical for operation. The float F may or may not pivot relative to the float arm A depending on the requirements of the sensing application. The float F attaches to the float arm F at opposite ends F1, F2 in a symmetrical manner that results in an upward force created by the buoyancy of the float F. This upward force is uniformly translated through the float arm A to the magnet hub 205 such that the least amount of cantilevering in the float arm A is produced. The resulting frictional forces between the magnet hub 205 and the pivot base 203 are minimized while system position accuracy and repeatability are improved.

Figure 13:
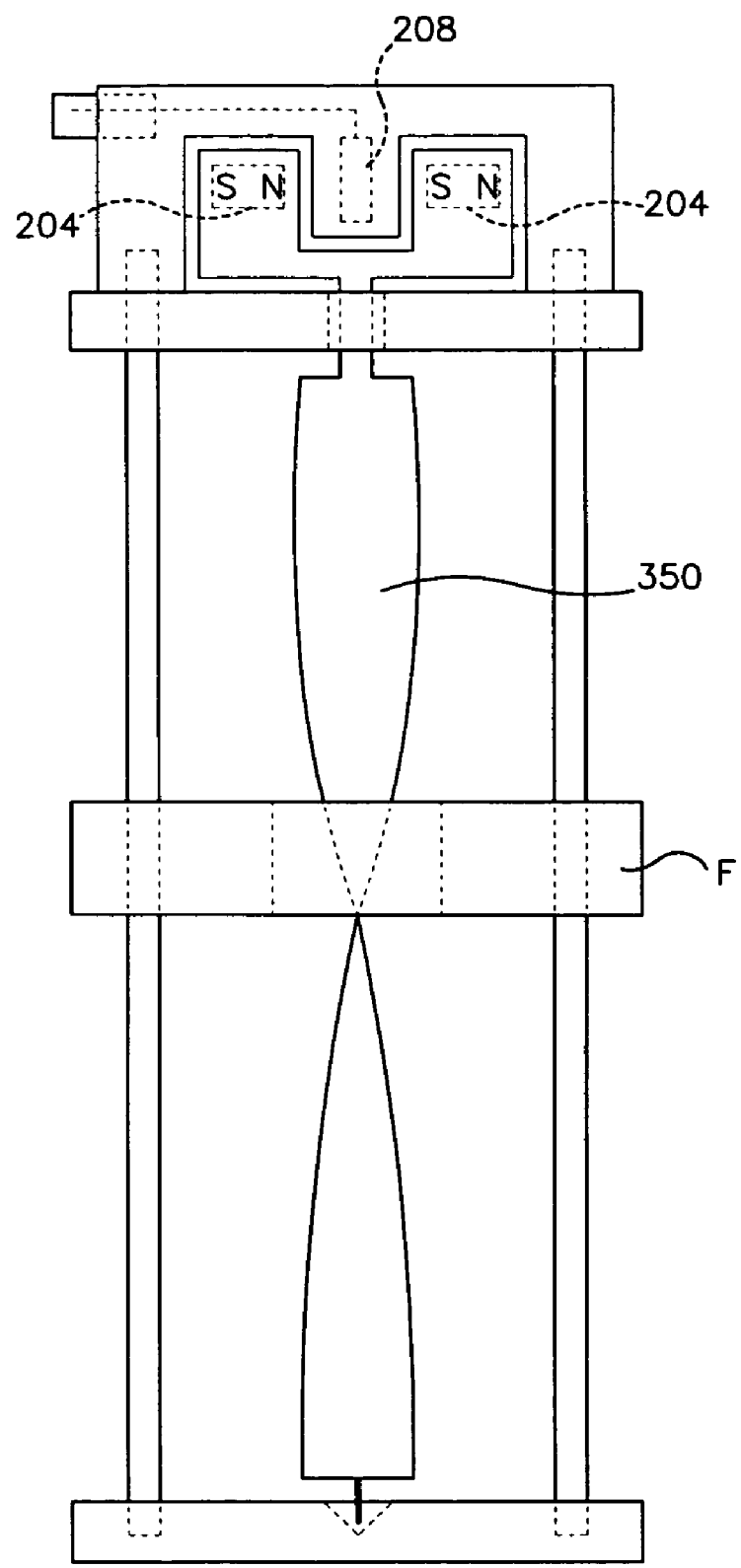
FIG. 13 illustrates an additional alternate embodiment with a different float, sensor arrangement.

Returning to the embodiment shown in FIG. 13, therein is depicted a float F constrained to move along a linear path of travel by two side rails. As the float F raises and lowers within a tank or fluid enclosure, the float exerts a torque on an elongated half turn flat ribbon 350 which passes through a center throughpassage of the float F. The ribbon in turn exerts a torque on a magnet assembly positioned above the float that includes two magnets 204. As the magnets rotate the field or flux between them varies and causes an output of a hall device 208 to change providing an indication of the linear position of the float F.

The disclosed alternate embodiments of the present invention have been described with a degree of particularity. It is the intent that the invention include all modifications and alterations from the disclosed design falling within the spirit or scope of the appended claims.

What is claimed:

1. Apparatus for sensing the level of fluid within a container comprising:
   a) a base fixed within the container;
   b) a movable member supported by the base for relative positioning with respect to said base;
   c) a float member that moves relative to the base as the level of fluid in a container changes;
   d) an arm attached to the movable member and float member wherein the position of the float is translated into movement of the moveable member with respect to said base;
   e) at least one magnetic flux sensor that is housed within a cavity containing encapsulant within the base located within said container and is coupled to one of the moveable member or base for creating an electrical output signal in response to a change in magnetic flux density; and f) at least one magnet disposed proximate the magnetic flux sensor coupled to one of the moveable member or base for providing a magnetic field to induce a change in electrical output response from the magnetic flux sensor as the float member moves with changes in fluid level.

2. A fluid level sensor according to claim 1 wherein the at least one magnetic flux sensor element comprises a programmable linear ratiometric Hall effect integrated circuit having programmable gain, offset voltage and temperature compensation.

3. A fluid level sensor according to claim 1 wherein the magnetic field is provided using a permanent magnet.

4. A fluid level sensor according to claim 1 wherein the magnetic flux sensor remains stationary while the magnetic field changes position relative to the magnetic flux sensor.

5. A fluid level sensor according to claim 1 wherein the float member and arm are attached to the movable member.

6. A fluid level sensor according to claim 1 wherein the base has an integral mounting feature so that the fluid level sensor can be mounted to and positively located on a fuel pump module, other fuel system mounting feature or other mounting feature within a fluid container.

7. A fluid level sensor according to claim 1 wherein the base or movable member has integral features for positively positioning the magnetic flux sensor.

8. A fluid level sensor according to claim 1 wherein the base has an integral electrical connector block for making electrical connections to the sensor electronics.

9. A fluid level sensor according to claim 1 wherein the base has a first travel stop to prevent the arm from exceeding maximum upward travel and a second travel stop to prevent the arm from exceeding maximum downward travel.

10. A fluid level sensor according to claim 1 wherein the float arm comprises a yoke that attaches symmetrically to the float to reduce cantilevering in the float arm.

11. A fluid level sensor according to claim 1 wherein a pivoting float maintains similar orientation to the fluid surface throughout the range of float arm travel.

12. A fluid level sensor according to claim 1 wherein a float geometry defines a float thickness that is less than a width dimension of generally flat float top and bottom surfaces to enhance float buoyancy for low fluid level detection.

13. A fluid level sensor according to claim 12 wherein the float thickness is less than either a width or length dimension of a generally rectangular float top and bottom surfaces to enhance float buoyancy for low fluid level detection.

14. Apparatus for sensing the level of fluid within a container comprising:
 a) a base fixed relative to the container;
 b) a movable member supported by the base for relative positioning with respect to said base;
 c) a float member that moves relative to the base as the level of fluid in a container changes;
 d) an arm attached to the movable member and float member wherein the position of the float is translated into movement of the moveable member with respect to said base;
 e) a sensor assembly having at least one magnetic flux sensor coupled to one of the moveable member or base for creating an electrical output signal in response to a change in magnetic flux density and a lead frame that helps to locate the magnetic flux sensor with respect to the moveable member or base; and
 f) at least one magnet disposed proximate the magnetic flux sensor coupled to one of the moveable member or base for providing a magnetic field to induce a change in electrical output response from the magnetic flux sensor as the float member moves with changes in fluid level.

15. A fluid level sensor according to claim 14 wherein said lead frame is made up of a number of leads that provide additional mechanical support and protection for the magnetic flux sensor.

16. A fluid level sensor according to claim 14 where the lead frame provides electrical terminals that complete an integrated electrical connector forming part of the pivot base.

17. A fluid level sensor according to claim 14 wherein the lead frame provides an electrical path to other circuitry.

18. Apparatus for sensing the level of fluid within a container comprising:
 a) a base fixed within the container;
 b) a movable member supported by the base for relative positioning with respect to said base;
 c) a float member that moves relative to the base as the level of fluid in a container changes;
 d) an arm attached to the movable member and float member wherein the position of the float is translated into movement of the moveable member with respect to said base;
 e) at least one magnetic flux sensor that is located within said container and is coupled to one of the moveable member or base for creating an electrical output signal in response to a change in magnetic flux density; and
 f) at least one magnet disposed proximate the magnetic flux sensor coupled to one of the moveable member or base for providing a magnetic field to induce a change in electrical output response from the magnetic flux sensor as the float member moves with changes in fluid level;
 g) said base comprising an encapsulant for isolating the flux sensor from harsh fluids found in liquid fuels.

19. A fluid level sensor according to claim 18 wherein said encapsulant protects the electronics by dampening mechanical vibration and shock.

20. A fluid level sensor according to claim 18 wherein said encapsulant maintains positive positioning of the magnetic flux sensor.

21. A method for fabricating a sensor for sensing the level of fluid within a container comprising:
 a) fixing a base within the container;
 b) coupling a movable member to the base for relative positioning with respect to said base;
 c) providing a float member that moves up and down as the level of fluid in a container changes;
 d) attaching the float member to the moveable member by means of an arm attached to the moveable member and float member wherein the position of the float is translated into movement of the moveable member with respect to said base;
 e) positioning a magnetic flux sensor within the chamber by coupling said magnetic flux sensor to one of the moveable member or base to create an electrical output signal in response to a change in magnetic flux density;
 f) positioning at least one magnet disposed proximate the magnetic flux sensor coupled to one of the moveable member or base for providing a magnetic field to induce a change in electrical output response from the magnetic flux sensor as the float member moves up and down with changes in fluid level; and g) providing an encapsulant for isolating the magnetic flux sensor from harsh fluids found in liquid fuels.

22. The method of claim 21 wherein said encapsulant maintains positive positioning of the magnetic flux sensor.

23. Apparatus for sensing the level of fluid within a container comprising:
 a) a base fixed within the container;
 b) a movable member supported by the base for relative positioning with respect to said base;
 c) a float member that moves relative to the base as the level of fluid in a container changes;
 d) an arm attached to the movable member and float member wherein the position of the float is translated into movement of the moveable member with respect to said base;
 e) at least one magnetic flux sensor that is located within said container and is coupled to one of the moveable member or base for creating an electrical output signal in response to a change in magnetic flux density; and
 f) at least one magnet disposed proximate the magnetic flux sensor coupled to one of the moveable member or base for providing a magnetic field to induce a change in electrical output response from the magnetic flux sensor as the float member moves with changes in fluid level;
 g) said moveable member comprising a maget hub that has at least one integral axial spring member that positions the magnet toward the magnet hub center axis.

24. A method for fabricating a sensor for sensing the level of fluid within a container comprising:
 a) fixing a base within the container;
 b) coupling a movable member to the base for relative positioning with respect to said base;
 c) providing a float member that moves up and down as the level of fluid in a container changes;
 d) attaching the float member to the moveable member by means of an arm attached to the moveable member and float member wherein the position of the float is translated into movement of the moveable member with respect to said base;
 e) positioning a magnetic flux sensor within the chamber by coupling said magnetic flux sensor to one of the moveable member or base to create an electrical output signal in response to a change in magnetic flux density;
 f) positioning at least one magnet disposed proximate the magnetic flux sensor coupled to one of the moveable member or base for providing a magnetic field to induce a change in electrical output response from the magnetic flux sensor as the float member moves up and down with changes in fluid level; and
 g) providing an encapsulant that protects the magnetic flux sensor by dampening mechanical vibration and shock.

* * * * *